TELEVISION DEFLECTION CIRCUIT

Filed Feb. 7, 1968

INVENTORS
ANIBAL MAYOR
JACK A. DEAN
BY Kenneth R. Schaefer
Attorney

United States Patent Office
3,459,993
Patented Aug. 5, 1969

3,459,993

TELEVISION DEFLECTION CIRCUIT

Anibal Mayor, Indianapolis, Ind., and Jack A. Dean, Flemington, N.J., assignors to Radio Corporation of America, a corporation of Delaware Filed Feb. 7, 1968, Ser. No. 703,743
Int. Cl. H01j 29/74
U.S. Cl. 315—29 7 Claims

ABSTRACT OF THE DISCLOSURE

A television vertical deflection circuit comprises an oscillator or switching stage and an output stage. A resistance-capacitance sawtooth generating circuit is coupled to an input electrode of the output stage. An additional relatively large capacitance is coupled between a point of reference potential and the end of the sawtooth generating circuit remote from the input electrode. A further resistance-capacitance network including a diode is coupled in a feedback arrangement between the output and the input electrodes of the output stage and develops a feedback voltage which is added to the sawtooth for vertical linearity and vertical size control. Means are provided to prevent spurious oscillations at one-half the vertical deflection frequency.

Figures 1, 2:
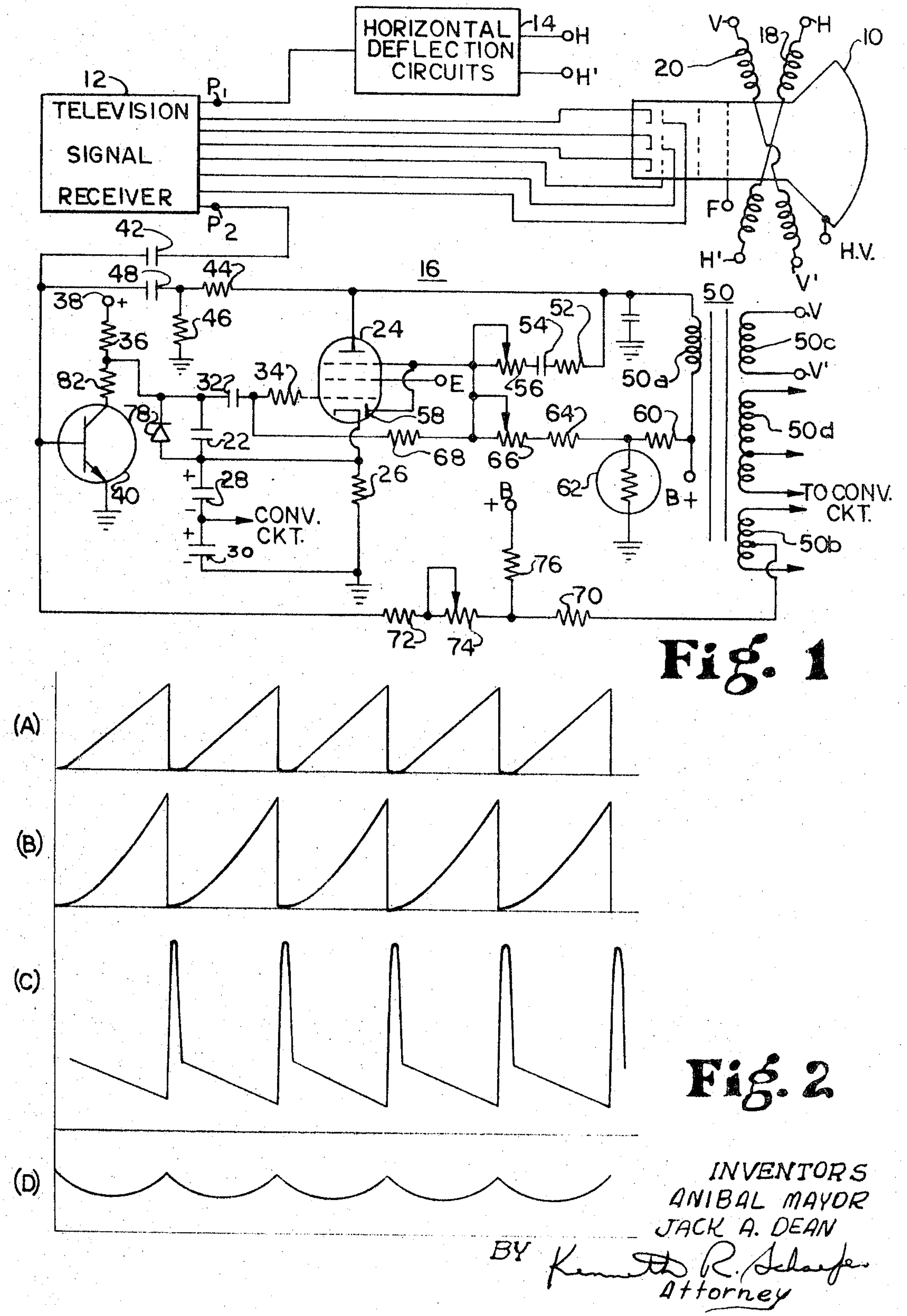

This invention relates to electromagnetic cathode ray beam deflection circuits of the type employed in television receivers and, in particular, to vertical deflection circuits for use in such apparatus.

In a co-pending U.S. patent application of Jack A. Dean entitled "Television Deflection Circuit," Ser. No. 624,775, filed Mar. 21, 1967 and now Patent No. 3,411,-031, a deflection circuit is described which employs a transistor oscillator stage and a pentode electron tube output stage. A resistance-capacitance sawtooth generating circuit is coupled to the input of the electron tube. The capacitance is subjected to alternate charging from a supply and discharging through the transistor in an operating cycle recurring at the television field rate (e.g. 60 Hz.). In certain applications, such as color television receivers, a relatively large capacitor for providing a waveform usable in convergence circuits is coupled to the output stage in the discharging circuit of the sawtooth capacitor.

The above-described deflection arrangement, under certain conditions, tends to sustain oscillations at a 30 Hz. rate (i.e., one-half the field rate), resulting in a loss of interlace from one field to the next.

In accordance with the present invention, the tendency to oscillate is overcome through the use of circuitry which functions to maintain the voltage across the sawtooth forming capacitance at a predetermined limit during the retrace portion of each deflection cycle thereby insuring generation of a sawtooth waveform having a substantially stable amplitude.

The novel features that are considered characteristic of this invention are set forth with particularity in the appended claims. The invention itself, however, both as to its organization and method of operation as well as additional objects thereof will best be understood from the following description when read in connection with the accompanying drawing in which:

FIGURE 1 is a schematic circuit diagram, partially in block form, of a television receiver embodying the present invention; and FIGURE 2 is a series of waveform diagrams which will be utilized in explaining the operation of the circuit shown in FIGURE 1.

In FIGURE 1, the bulk of the circuits of a television receiver serving to provide signals for energizing an image-reproducing device such as a kinescope 10 are represented by a single block 12 labelled "Television Signal Receiver." The receiver unit 12 incorporates the usual elements required to provide video signals for appropriate intensity modulation of the electron beams of kinescope 10 (see, for example, RCA Victor Television Service Data, 1967, No. T15, published by RCA Sales Corporation, Indianapolis, Ind.). Receiver unit 12 also incorporates apparatus for providing suitable synchronizing pulse information (at terminals $P_1$ and $P_2$) to synchronize, in respective horizontal and vertical deflection circuits 14 and 16, the energization of the respective horizontal and vertical windings 18 and 20 of the deflection yoke associated with kinescope 10.

In vertical deflection circuit 16, a first capacitor 22 for providing a sawtooth voltage waveform is coupled between the control grid (input) and cathode electrodes of a pentode output amplifying stage 24. Output stage 24 comprises cathode and anode electrodes, and a control grid, screen grid and a suppressor grid disposed in the named order between the cathode and anode. A resistor 26 is coupled between the cathode of output stage 24 and ground. Second and third capacitors 28 and 30, of relatively large value are coupled in series relation across resistor 26 and provide, at their junction, a substantially parabolic voltage waveform for use in electron beam convergence circuits (not shown). The end of sawtooth capacitor 22 remote from resistor 26 is coupled by means of the series combination of a coupling capacitor 32 and a resistor 34 to the control grid of output stage 24. A current supply comprising a relatively large resistor 36 and a relatively high (e.g., +750 v.) voltage supply connected to terminal 38 is coupled to the junction of capacitors 22 and 32 to provide a relatively constant charging current to capacitor 22.

A transistor oscillator or switching stage 40 is coupled from the junction of capacitors 22 and 32 to ground. Oscillator stage 40 is supplied via terminal $P_2$ and a coupling capacitor 42 with vertical synchronizing pulses.

The anode (output elecerode) of output stage 24 also is coupled to the input (base) electrode of oscillator stage 40 by means of a wave-shaping network comprising resistors 44 and 46 and capacitor 48. Direct operating voltage B+ is supplied to the anode of output stage 24 via the primary winding 50*a* of a vertical output transformer 50. The screen grid of output stage 24 is coupled to a further source of direct voltage E. A feedback network comprising the series combination of a resistor 52, a capacitor 54 and a variable resistance linearity control 56 is coupled between the anode electrode and suppressor grid of output stage 24. The suppressor grid, in turn, is connected to the anode electrode 58 of a diode which may be constructed in the same envelope as output stage 24. The cathode of output stage 24 in that case, as is shown, also serves as the cathode for the diode anode 58.

A compensated voltage source comprising a resistor 60 and a voltage dependent resistor (VDR) 62 is connected across the B+ supply. The voltage provided at the junction of resistor 60 and VDR 62 is coupled by means of a resistor 64 to a variable resistance height control 66 which, in turn, is coupled to the feedback network at the suppressor grid of output stage 24. A bias voltage developed at the junction of height control 66 and linearity control 56 is coupled by means of a resistor 68 to the junction of resistor 34 and coupling capacitor 32.

Oscillator stage 40 is provided with an additional triggering waveform component derived from a secondary winding 50*b* of output transformer 50.

The triggering waveform component is coupled to oscillator stage 40 by means of the series combination of first and second resistors 70 and 72 and a variable resistance hold control 74. A D-C bias supply is provided by means of a resistor 76 coupled from the B+ supply to the junction of resistor 70 and hold control 74.

The desired vertical deflection output waveform is supplied to the vertical deflection windings 20 by means of an additional winding 50c on output transformer 50.

In accordance with one aspect of the present invention, unidirectionally conductive means comprising a diode 78 are coupled across sawtooth capacitor 22 for limiting voltage excursions of one polarity across capacitor 22. In some circuit configurations, it also may be desirable to couple a resistor in series with diode 78 across capacitor 22.

Referring to FIGURE 2 in connection with FIGURE 1, the operation of vertical deflection circuit 16 now will be described.

Each vertical deflection cycle comprises a relatively long duration trace portion and a relatively short duration retrace portion. The vertical deflection cycle recurs at a nominal rate of, for example, sixty times per second.

In vertical deflection circuit 16, a substantially sawtooth voltage waveform (FIGURE 2, waveform A) is produced across capacitor 22 by means of alternate charging via the path including resistors 36 and 26 from the relatively high voltage provided at terminal 38 (+750 v.) and discharging through the path including the collector-emitter circuit of transistor 40, resistor 82 and the series combination of capacitors 28 and 30 in parallel with resistor 26. The sawtooth voltage waveform A is coupled, after removal of the direct component thereof by capacitor 32, to the control grid of output stage 24. Anode current variations (waveform B) which are produced in output stage 24 as a result of the voltage applied to the control grid pass through transformer primary winding 50a and, after modification by the turns ratio of transformer 50, are coupled to deflection winding 20 and the convergence circuits (not shown) by means of windings 50c and the combination of windings 50b and 50d, respectively.

During the trace portion of each deflection cycle, the anode current (waveform B) increases causing the anode voltage (waveform C) to decrease in a substantially linear manner. At the end of vertical trace, a positive polarity vertical synchronizing pulse is applied via capacitor 42 to the input (base) of transistor 40 so as to render transistor 40 conductive. As transistor 40 commences conduction, the voltage across capacitor 22 decreases rapidly (i.e., capacitor 22 discharges) driving the control grid of output stage 24 negative. The output stage 24 is driven rapidly into cutoff while the anode voltage (waveform C) increases repadly as a result of the energy stored in the inductive components including transformer 50 and deflection windings 20. The increasing retrace anode voltage is of the correct polarity to maintain transistor 40 conductive via the path including resistors 44 and 46 and capacitor 48. Furthermore, the retrace anode voltage produces conduction in the unidirectionally conductive feedback circuit which includes resistor 52, capacitor 54, linearity control 56, the diode formed by anode 58 and the cathode of output stage 24, and cathode resistor 26. Capacitor 54 charges relatively rapidly during retrace. As is set forth in detail in the above-mentioned U.S. Patent No. 3,411,031, the shape of the waveform supplied by capacitor 54 to the control grid of output stage 24, and therefore the linearity of the vertical deflection waveform, is determined by the setting of linearity control 56. The direct voltage component of the waveform supplied by capacitor 54, and therefore the bias applied to the control grid of output stage 24, is determined by the setting of height control 66. Near the end of retrace, as the anode voltage of output stage 24 decreases, the voltage applied to the base of transistor 40 also decreases until transistor 40 is turned "off" (i.e., rendered non-conductive). Capacitor 22 then commences recharging to initiate the next deflection cycle.

In the operation of deflection circuit 16, a substantially constant voltage exists across capacitor 32 since, for this capacitor, the charging time constant is selected much shorter than the corresponding discharging time constant. Therefore, variations produced in the voltage at the control grid of output stage 24 are produced either by variations in the voltage provided from the feedback network 52, 54, 56, 68, or from the voltage provided by the sawtooth forming capacitor 22. During the trace portion of each vertical deflection cycle, the voltage across capacitor 22 (waveform A) increases relatively slowly (e.g., charging time constant of approximately one-half second). When transistor 40 is rendered conductive to initiate retrace, capacitor 22 discharges rapidly (e.g., approximately five microseconds). The discharging time is only a small fraction of the interval during which transistor 40 is conductive (e.g., vertical retrace interval of six hundred microseconds). Capacitor 22 therefore discharges completely and tends to recharge during retrace to the voltage existing across capacitors 28 and 30 in series. If such recharging occurs, capacitor 22 would apply to the control grid of output stage 24 a drive voltage waveform having a starting point which reflects changes in the voltage across capacitors 28 and 30. For example, if during a particular deflection cycle the current supplied during trace by output stage 24 should increase, the voltage across capacitor 28 and 30 (waveform D) would also increase. During the succeeding retrace interval, capacitor 22 would tend to charge in such a direction as to cause the starting point of the drive voltage waveform supplied to the control grid of output stage 24 to be more negative than in the previous deflection cycle. Since the time duration of the trace interval is substantially constant and the charging rate of capacitor 22 also is fixed, the voltage change across capacitor 22 during trace is also substantially constant. A lower starting voltage on capacitor 22 therefore results in a lowering by the same amount of the drive voltage waveform produced across capacitor 22. Therefore, if capacitor 22 was charged negatively from capacitors 28 and 30 during retrace, during the next succeeding trace interval, the trace current supplied by output stage 24 would decrease below its normal level, the voltage across capacitors 28 and 30 would decrease and the retrace voltage pulse (waveform C) would decrease.

During the next vertical deflection cycle, the starting point of the drive voltage waveform applied to the control grid of output stage 24 would be less negative than normal. Therefore, output current, cathode voltage and the retrace voltage pulse associated with output stage 24 all would be greater than normal. This alternation of output current above and below the normal level would continue such that during successive vertical deflection periods, the vertical raster alternately would be larger and smaller than required. This oscillation would be observed on the kinescope 10 as, for example, a loss of vertical interlace, a "jitter" of the display in the vertical direction or displaced vertical fields.

The above-described tendency to oscillate is precluded by coupling diode 78 across capacitor 22. During retrace, the voltage across capacitor 22 is maintained substantially at a zero level and any tendency to charge to the voltage across capacitors 28 and 30 is prevented by diode 78. The end of capacitor 22 coupled to the control grid of output stage 24 is therefore prevented from being charged in a negative sense with respect to the opposite end of capacitor 22 during retrace.

What is claimed is:

1. In a television receiver having a cathode ray image-reproducing tube and an electromagnetic deflection yoke for said tube including vertical deflection windings, a vertical deflection circuit comprising:

an amplifier having input, output and common electrodes, means for coupling said deflection windings to said output electrode for supplying deflection current to said windings, circuit means comprising a voltage supply of a first polarity and a first capacitor for developing a sawtooth voltage waveform, means for coupling said first capacitor between said input and common electrodes, a second capacitor for providing a voltage of said first polarity coupled between said common electrode and a point of reference voltage, switching means coupled across said first and second capacitors for discharging at least said first capacitor during the retrace interval of each vertical deflection cycle, and unidirectionally conductive limiting means coupled to said first capacitor for preventing discharge of said second capacitor through said first capacitor in such a sense as to develop a voltage of said first polarity at said input electrode during said retrace interval and thereby preventing excursions, beyond a predetermined limit, of the voltage produced across said first capacitor during said retrace interval of each vertical deflection cycle.

2. A vertical deflection circuit according to claim 1 and further comprising means for rendering said switching means conductive throughout the retrace interval of each vertical deflection cycle, and wherein the discharging time constant of said first capacitor is of substantially shorter duration than said retrace interval.

3. A vertical deflection circuit according to claim 2 wherein the discharging time constant of said second capacitor is of greater duration than the discharging time constant of said first capacitor.

4. A vertical deflection circuit according to claim 1 and further comprising means for supplying an operating bias voltage between said input and common leectrodes and wherein said means for coupling said first capacitor comprises a third capacitor coupled between said input electrode and said first capacitor.

5. A vertical deflection circuit according to claim 4 wherein said limiting means comprises a diode coupled across said first capacitor.

6. A vertical deflection circuit according to claim 5 wherein said diode is poled to limit voltage excursions across said first capacitor of such a polarity as to produce a voltage at said input electrode of like polarity with respect to said bias voltage.

7. A vertical deflection circuit according to claim 6 wherein said diode is poled to limit negative polarity voltage excursions at the junction of said first and third capacitors.

References Cited

UNITED STATES PATENTS

| | | | |
|---|---|---|---|
| 3,178,593 | 4/1965 | Diehl | 315—27 |
| 3,340,423 | 9/1967 | Doland | 315—27 |

RODNEY D. BENNETT, Jr., Primary Examiner

JOSEPH G. BAXTER, Assistant Examiner

U.S. Cl. X.R.

315—27